United States Patent
Ueno et al.

(10) Patent No.: US 9,273,616 B2
(45) Date of Patent: Mar. 1, 2016

(54) INTAKE CONTROL SYSTEM FOR INTERNAL COMBUSTION ENGINE

(71) Applicant: HONDA MOTOR CO., LTD., Tokyo (JP)

(72) Inventors: Masaki Ueno, Wako (JP); Masaya Agata, Wako (JP); Hisashi Ito, Wako (JP); Chiho Chinda, Wako (JP); Daisuke Shiomi, Wako (JP); Hideharu Takamiya, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 3 days.

(21) Appl. No.: 14/355,640

(22) PCT Filed: Oct. 18, 2012

(86) PCT No.: PCT/JP2012/076923
§ 371 (c)(1),
(2) Date: May 1, 2014

(87) PCT Pub. No.: WO2013/069427
PCT Pub. Date: May 16, 2013

(65) Prior Publication Data
US 2014/0261312 A1    Sep. 18, 2014

(30) Foreign Application Priority Data

Nov. 10, 2011  (JP) ................................ 2011-246831
Dec. 16, 2011  (JP) ................................ 2011-276307

(51) Int. Cl.
*F02D 21/08* (2006.01)
*F02M 25/07* (2006.01)
(Continued)

(52) U.S. Cl.
CPC *F02D 21/08* (2013.01); *F02D 9/02* (2013.01); *F02D 9/08* (2013.01); *F02M 25/07* (2013.01); *F02D 2021/083* (2013.01); *Y02T 10/121* (2013.01)

(58) Field of Classification Search
CPC .... F02M 25/07; F02D 21/08; F02D 2021/083
USPC ............ 123/568.19, 568.21, 568.22; 701/108
See application file for complete search history.

(56) References Cited

U.S. PATENT DOCUMENTS 4,224,912 A * 9/1980 Tanaka ...................... 123/568.19
4,433,666 A * 2/1984 Masaki et al. ........... 123/568.22
(Continued)

FOREIGN PATENT DOCUMENTS

JP    8-232769 A    9/1996
JP    10-9064 A    1/1998
(Continued)

OTHER PUBLICATIONS

International Search Report dated Jan. 22, 2013 corresponding to International Patent Application No. PCT/JP2012/076923 and English translation thereof.
(Continued)

*Primary Examiner* — Mahmoud Gimie
(74) *Attorney, Agent, or Firm* — Squire Patton Boggs (US) LLP

(57) ABSTRACT

An intake control system for an internal combustion engine is capable of ensuring a differential pressure across an EGR valve, and controlling an EGR amount with high accuracy. A target fresh air amount is set based on a demanded torque calculated according to operating conditions of the engine. A differential pressure across an EGR valve is set as a target differential pressure. When it is determined that the across-valve differential pressure is not in a state in which the target differential pressure can be ensured, an opening degree of the EGR valve is controlled to limit an EGR amount. An opening degree of a throttle valve is controlled based on the target fresh air amount, so as to ensure the target differential pressure.

4 Claims, 11 Drawing Sheets

(51) Int. Cl.
  *F02D 9/02* (2006.01)
  *F02D 9/08* (2006.01)

(56) References Cited

U.S. PATENT DOCUMENTS

| | | | | |
|---|---|---|---|---|
| 5,152,273 | A | * | 10/1992 | Ohuchi .................... 123/568.16 |
| 2001/0029935 | A1 | * | 10/2001 | Cook ........................ 123/568.27 |
| 2002/0007821 | A1 | * | 1/2002 | Isobe et al. .................... 123/480 |
| 2002/0139361 | A1 | | 10/2002 | Itoyama et al. |
| 2004/0084031 | A1 | | 5/2004 | Ito et al. |

FOREIGN PATENT DOCUMENTS

| | | |
|---|---|---|
| JP | 11-082090 A | 3/1999 |
| JP | 11-173218 A | 6/1999 |
| JP | 2001-280202 A | 10/2001 |
| JP | 2002-004904 A | 1/2002 |
| JP | 2004-150343 A | 5/2004 |
| JP | 3888024 B2 | 2/2007 |
| JP | 2010-096049 A | 4/2010 |
| WO | WO 2011/076876 A1 | 6/2011 |

OTHER PUBLICATIONS

Chinese Office Action dated Feb. 28, 2015 corresponding to Chinese Patent Application No. 201280046481.9.

German Office Action dated Apr. 9, 2015 corresponding to German Patent Application No. 11 2012 004 697.8 and English translation thereof.

Office Action dated Sep. 14, 2015, issued in corresponding CN Application No. 201280046481.9.

* cited by examiner

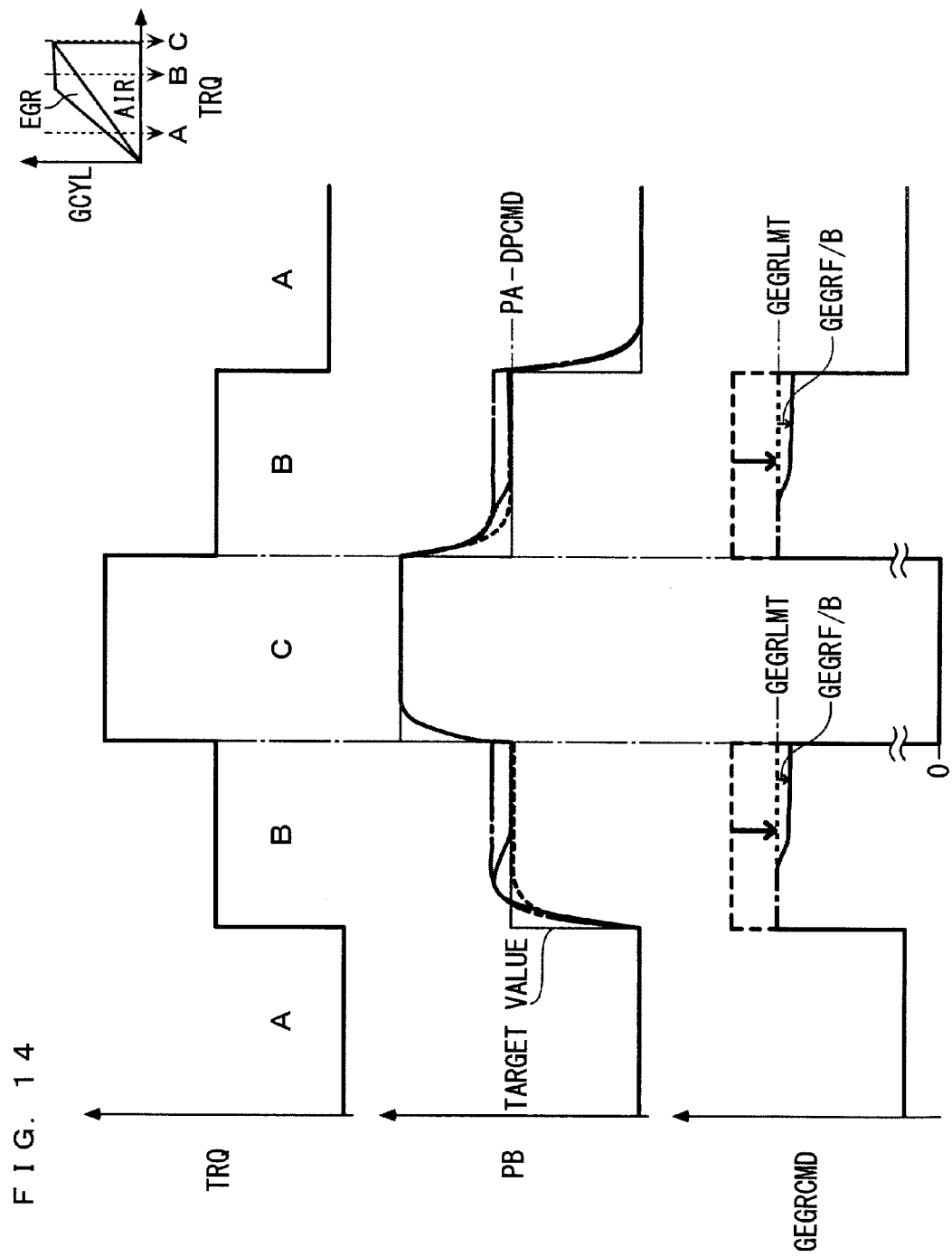

INTAKE CONTROL SYSTEM FOR INTERNAL COMBUSTION ENGINE

FIELD OF THE INVENTION

The present invention relates to an intake control system for an internal combustion engine, for controlling an amount of EGR gases recirculated from an exhaust passage to an intake passage via an EGR passage, and an amount of fresh air drawn into a combustion chamber.

BACKGROUND ART

A conventional intake control system for an internal combustion engine of this type is disclosed in PTL 1. This internal combustion engine is e.g. a diesel engine, including an intake throttle valve that is disposed in an intake passage, an EGR passage that is connected to an exhaust passage and a portion of the intake passage downstream of the intake throttle valve, for recirculating part of exhaust gases discharged into the exhaust passage, and an EGR valve that is disposed in the vicinity of an outlet of the EGR passage to the intake passage, for adjusting the EGR amount.

Further, in this intake control system, a differential pressure across the EGR valve is calculated, and if the calculated across-valve differential pressure is not more than a predetermined value, the intake throttle valve is throttled to thereby increase the across-valve differential pressure. As a consequence, the differential pressure across the EGR valve is ensured, and a degree of change in EGR amount with respect to an opening degree of the EGR valve is made moderate to thereby perform control of the EGR amount by the EGR valve with high accuracy.

CITATION LIST

[Patent Literature 1]
[PTL 1] Publication of Japanese Patent No. 3888024

SUMMARY OF INVENTION

Technical Problem

As described above, in the conventional intake control system, in the diesel engine, when the differential pressure across the EGR valve is not more than a predetermined value, the differential pressure across the EGR valve is ensured by throttling the intake throttle valve so as to perform control of the EGR amount by the EGR valve with high accuracy. However, if this method is used for a gasoline engine that burns an air-fuel mixture of a stoichiometric air-fuel ratio, a fresh air amount is reduced by throttling the intake throttle valve, and accordingly torque of the engine is reduced. This causes a problem that it is impossible to meet a torque demand by the driver, resulting in degraded drivability.

The present invention has been made to provide a solution to the above-described problem, and an object thereof is to provide an intake control system for an internal combustion engine, which is capable of ensuring a differential pressure across an EGR valve while maintaining drivability even in a case where an air-fuel mixture of a stoichiometric air-fuel ratio is burned, thereby making it possible to control an EGR amount with high accuracy.

Solution to Problem

To attain the above object, the present invention according to claim 1 is an intake control system for an internal combustion engine, comprising a throttle valve 10a provided in an intake passage 6 of the engine 3, for adjusting an amount of fresh air drawn into a combustion chamber 3d, an EGR passage 12 for recirculating part of exhaust gases discharged from the combustion chamber 3d into an exhaust passage 7 to a downstream side of the throttle valve 10a in the intake passage 6, an EGR valve 13a disposed in an intermediate portion of the EGR passage 12, for adjusting an EGR amount GEGR, which is an amount of exhaust gases recirculated through the EGR passage 12, operating condition-detecting means (crank angle sensor 20, accelerator pedal opening sensor 21) for detecting operating conditions (engine speed NE, accelerator pedal opening AP) of the engine 3, demanded torque-calculating means (ECU 2, step 1 in FIG. 3) for calculating a demanded torque TRQ demanded by a driver according to the detected operating conditions of the engine 3, target fresh air amount-setting means (ECU 2, step 2 in FIG. 3) for setting a target fresh air amount GAIRCMD based on the calculated demanded torque TRQ, required differential pressure-setting means (ECU 2, step 4 in FIG. 3) for setting an across-valve differential pressure (atmospheric pressure PA—intake pressure PB) required to stably recirculate exhaust gases, which is a difference in pressure between an upstream side and a downstream side of the EGR valve 13a, as a required differential pressure DPCMD, differential pressure state-determining means (ECU 2, steps 5 to 8 in FIG. 3) for determining whether or not the across-valve differential pressure is in a state in which the set required differential pressure DPCMD can be ensured, and control means (ECU 2, steps 8, 9 in FIG. 3, FIG. 8, FIG. 10) for, when it is determined that the across-valve differential pressure is not in the state in which the set required differential pressure DPCMD can be ensured, reducingly controlling an opening degree (EGR valve opening LEGR) of the EGR valve 13a to thereby limit the EGR amount GEGR and controlling an opening degree (throttle valve opening θTH) of the throttle valve 10a such that the target fresh air amount GAIRCMD of fresh air is drawn into the combustion chamber 3d, so as to ensure the required differential pressure DPCMD.

According to this intake control system for an internal combustion engine, the amount of fresh air drawn into the combustion chamber is adjusted by the throttle valve disposed in the intake passage. Further, part of exhaust gases discharged from the combustion chamber into the exhaust passage is recirculated to the downstream side of the throttle valve in the intake passage via the EGR passage, and the EGR amount is adjusted by the EGR valve disposed in the intermediate portion of the EGR passage. Further, the demanded torque demanded by the driver is calculated according to the detected operating conditions of the engine, and the target fresh air amount is calculated based on the calculated demanded torque.

According to the present invention, the differential pressure across the EGR valve (difference in pressure between the upstream side and the downstream side) required to stably recirculate exhaust gases is set as the required differential pressure, and it is determined whether or not the differential pressure across the EGR is in the state in which the set required differential pressure can be ensured. Then, if it is determined that the across-valve differential pressure is not in the state in which the set required differential pressure can be ensured, the opening degree of the EGR valve is reducingly controlled to limit the EGR amount so as to ensure the set required differential pressure. This causes the across-valve differential pressure to be increased, and the set required differential pressure to be ensured, whereby it is possible to stably recirculate exhaust gases, and thereby control the EGR amount with high accuracy.

On the other hand, also in the above-mentioned situation, the fresh air amount is held at the target fresh air amount by controlling the opening degree of the throttle valve such that the target fresh air amount of fresh air set based on the demanded torque is drawn into the combustion chamber. Therefore, differently from the conventional control system, also in a case where an air-fuel mixture of a stoichiometric air-fuel ratio is burned, the torque of the engine is prevented from being reduced, whereby a torque demand by the driver is met, which makes it possible to maintain drivability.

The invention according to claim 2 is the control system recited in claim 1, wherein the differential pressure across the EGR valve 13a is a difference between atmospheric pressure PA and pressure (intake pressure PB) in the intake passage 6 on the downstream side of the throttle valve 10a.

The upstream side of the EGR valve is communicated with the atmosphere via the upstream portion of the EGR passage and the exhaust passage, and the downstream side of the EGR valve is communicated with the downstream side of the throttle valve in the intake passage via the downstream portion of the EGR passage. Therefore, the difference between the atmospheric pressure and the intake pressure which are pressures in these communicating portions excellently indicates the differential pressure across the EGR valve. Therefore, by using the difference between the atmospheric pressure and the intake pressure as the differential pressure across the EGR valve, it is possible to effectively obtain the above-described advantageous effects provided by claim 1.

Further, the atmospheric pressure is a parameter usually used for control of the engine, and hence a result of detection from existing detection means usually provided for detecting the atmospheric pressure can be directly used. Further, the required differential pressure is ensured by the above-described control, so that the difference between the atmospheric pressure and the intake pressure is controlled to the target value, and therefore it is possible to perform control using the difference between the two pressures, e.g. purge control of evaporated fuel, with high accuracy.

The invention according to claim 3 is the control system as recited in claim 1, further comprising atmospheric pressure-detecting means (atmospheric pressure sensor 22) for detecting atmospheric pressure PA, target EGR amount-setting means (ECU 2, step 3 in FIG. 3) for setting a target EGR amount GEGRCMD based on operating conditions of the engine 3, limit intake pressure-setting means (ECU 2, step 5 in FIG. 3) for setting a limit intake pressure PBCMD for ensuring the required differential pressure, by subtracting the required differential pressure DPCMD from the detected atmospheric pressure PA, limit intake air amount-calculating means (ECU 2, step 6 in FIG. 3) for calculating a limit intake air amount GCYLLMT of intake air which can be drawn into the combustion chamber 3d based on the set limit intake pressure PBCMD, and limit EGR amount-calculating means (ECU 2, step 7 in FIG. 3) for calculating a limit EGR amount GEGRLMT by subtracting the target fresh air amount GAIRCMD from the calculated limit intake air amount GCYLLMT, and wherein the differential pressure state-determining means determines whether or not the across-valve differential pressure is in a state in which the required differential pressure DPCMD can be ensured, by comparing the set target EGR amount GEGRCMD and the calculated limit EGR amount GEGRLMT (step 8 in FIG. 3), and wherein when the target EGR amount GEGRCMD is larger than the limit EGR amount GEGRLMT, the control means limits the target EGR amount GEGRCMD to the limit EGR amount GEGRLMT, and controls the opening degree of the EGR valve 13a based on the limited target EGR amount (steps 8, 9 in FIG. 3, FIG. 10).

With this configuration, the target EGR amount is set based on the operating conditions of the engine. Further, the limit intake pressure for ensuring the required differential pressure is set by subtracting the required differential pressure from the detected atmospheric pressure, and the limit intake air amount of intake air which can be drawn into the combustion chamber is calculated based on the set limit intake pressure. This causes the limit intake air amount to be properly calculated which is an upper limit value of the intake air amount required to ensure the set required differential pressure. Further, the limit EGR amount, which is an upper limit value of the EGR amount, is calculated by subtracting the target fresh air amount from the limit intake air amount, and it is determined by comparing the limit EGR amount and the target EGR amount whether or not the across-valve differential pressure is in the state in which the required differential pressure can be ensured.

Then, when the target EGR amount is larger than the limit EGR amount, it is determined that the required differential pressure cannot be ensured, and the target EGR amount is limited to the limit EGR amount according to the determination, and the opening degree of the EGR valve is controlled based on the limited target EGR amount. By executing the above-described control, when the sum of the target fresh air amount and the target EGR amount exceeds the limit intake air amount which makes it possible to ensure the required differential pressure, the fresh air amount is ensured by maintaining the target fresh air amount, and on the other hand, the target EGR amount is limited such that the sum of the target fresh air amount and the target EGR amount becomes equal to the limit intake air amount. Therefore, it is possible to excellently obtain the above-described advantageous effects provided by claim 1 that the EGR control can be performed with high accuracy by ensuring the required differential pressure, and that drivability can be maintained by ensuring the fresh air amount.

The invention according to claim 4 is the control system 1 as recited in claim 3, further comprising intake pressure-detecting means (intake pressure sensor 24) for detecting pressure in the intake passage 6 on the downstream side of the throttle valve 10a as intake pressure PB, and correction means (ECU 2, steps 42, 45, 48 in FIG. 13, step 33 in FIG. 12) for reducingly correcting the target EGR amount GERCMD when a difference (actual differential pressure DP) between the atmospheric pressure PA and the detected intake pressure PB is smaller than the required differential pressure PBCMD.

Even when the target EGR amount is limited according to predetermined conditions in a feedforward manner so as to ensure the required differential pressure, as in claim 3 recited above, there are cases where the required differential pressure cannot be ensured due to deviation of the intake characteristics caused by variation in hardware configuration or aging. With this configuration, the difference between the detected atmospheric pressure and intake pressure is obtained as the actual differential pressure across the EGR valve, and when this across-valve differential pressure is smaller than the required differential pressure, the target EGR amount is corrected in a feedback manner, and hence even when there has been caused a deviation in intake characteristics, it is possible to ensure the required differential pressure.

The invention according to claim 5 is the control system 1 as recited in any one of claims 1 to 4, further comprising atmospheric pressure-detecting means (atmospheric pressure sensor 22) for detecting atmospheric pressure PA, and the required differential pressure-setting means sets the required differential pressure DPCMD to a larger value as the detected atmospheric pressure PA is lower (step 4 in FIG. 3, FIG. 4).

In a case where the condition of the differential pressure across the EGR valve is the same, as the atmospheric pressure, which is a pressure on the upstream side of the EGR valve, is lower, a degree of change in EGR amount with respect to a change in pressure on the downstream side becomes larger, which tends to make recirculation of exhaust gases unstable. With this configuration, as the detected atmospheric pressure is lower, the required differential pressure is set to a larger value, and hence it is possible to ensure a larger across-valve differential pressure to thereby make it possible to stabilize recirculation of exhaust gases. Therefore, even when the atmospheric pressure is low, it is possible to control the EGR amount with high accuracy.

BRIEF DESCRIPTION OF THE DRAWINGS

FIG. 14 A timing diagram schematically showing an example of operation according to the present embodiment together with a comparative example.

MODE FOR CARRYING OUT INVENTION

Figure 1:
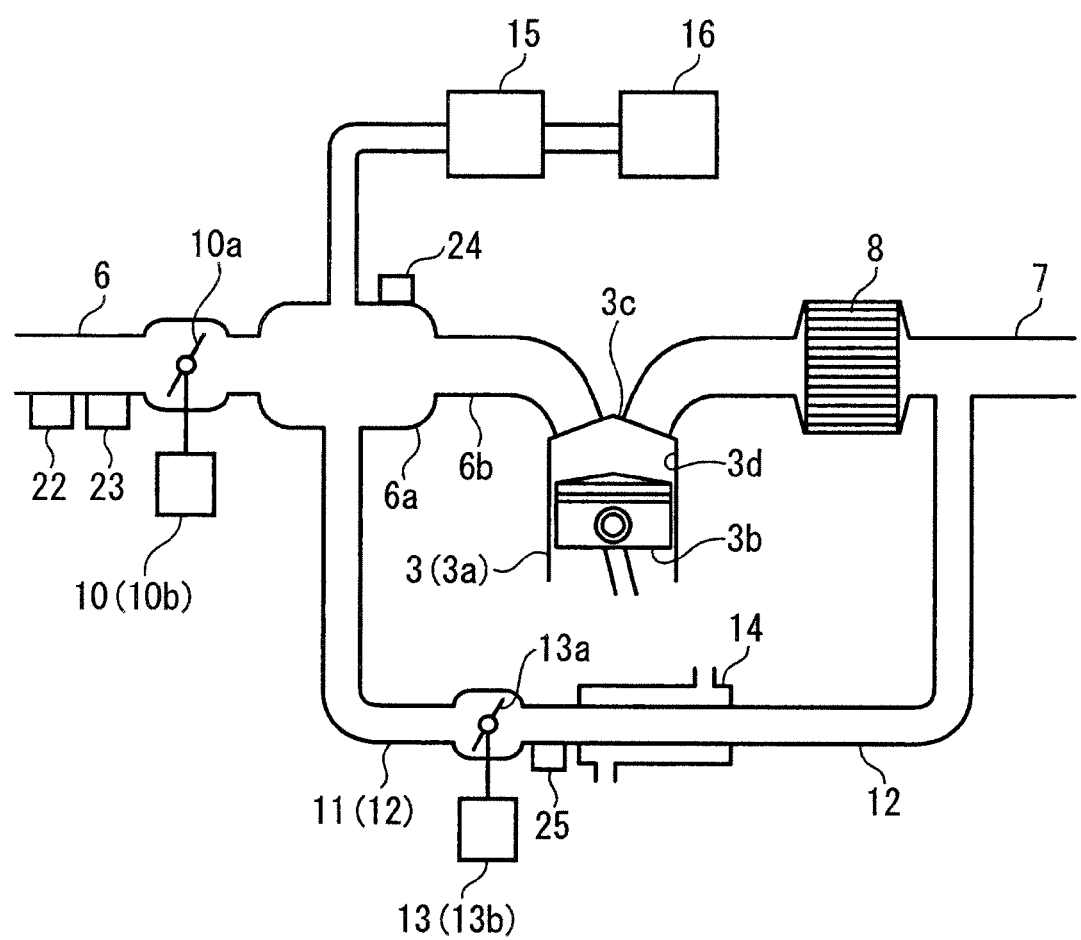
FIG. 1 A diagram schematically showing an internal combustion engine to which the present invention is applied.

The invention will now be described in detail with reference to drawings showing a preferred embodiment thereof. FIG. 1 shows an internal combustion engine (hereinafter referred to as the "engine") 3 to which the present invention is applied. The engine 3 is a gasoline engine that is installed on a vehicle (not shown), and has e.g. four cylinders 3a (only one of which is shown). A combustion chamber 3d is defined between a piston 3b and a cylinder head 3c for each of cylinders 3a of the engine 3.

Figure 2:
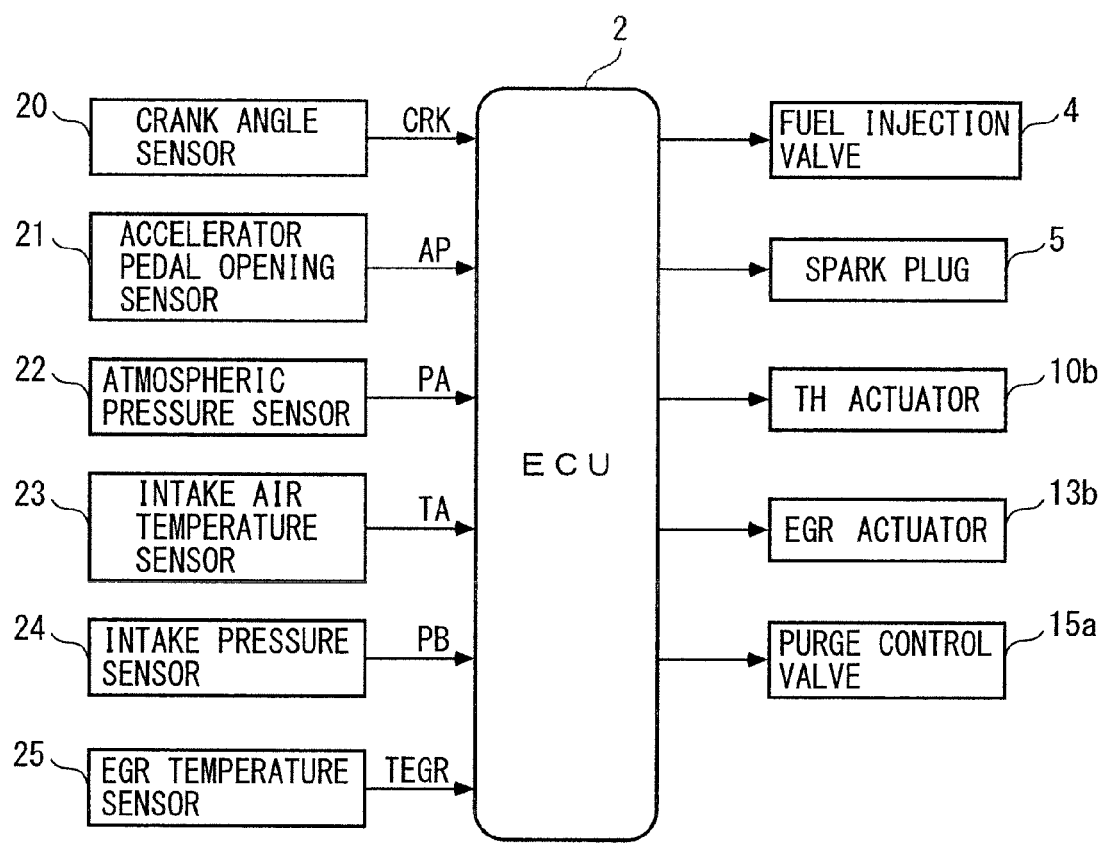
FIG. 2 A block diagram of an intake control system.

An intake passage 6 is connected to each cylinder 3a via an intake manifold 6b having an intake collector 6a, and an exhaust passage 7 is connected to the cylinder 3a via an exhaust manifold (not shown). The intake manifold 6b is provided with fuel injection valves 4 (see FIG. 2) and the cylinder head 3c is provided with spark plugs 5 (see FIG. 2), on a cylinder-by-cylinder basis. The injection amount and injection timing of fuel injected by each fuel injection valve 4, and ignition timing of each spark plug 5 are controlled by control signals from an ECU 2, referred to hereinafter.

A throttle valve mechanism 10 is disposed in the intake passage 6 at a location upstream of the intake collector 6a. The throttle valve mechanism 10 includes a throttle valve 10a of a butterfly type disposed in the intake passage 6, and a TH actuator 10b for actuating the throttle valve 10a. An opening degree θTH of the throttle valve 10a (hereinafter referred to as the "throttle valve opening θTH") is controlled by controlling a duty factor of electric current supplied to the TH actuator 10b by the ECU 2, whereby a fresh air amount GAIR of intake air drawn into the combustion chamber 3d is adjusted.

An exhaust emission purifier 8 comprising a three-way catalyst (not shown) etc., for purifying exhaust gases discharged from the combustion chamber 3d is provided in the exhaust passage 7.

Further, the engine 3 is provided with an EGR device 11 for recirculating part of exhaust gases discharged into the exhaust passage 7 to the intake passage 6, as EGR gases. The EGR device 11 comprises an EGR passage 12, an EGR valve mechanism 13 disposed in an intermediate portion of the EGR passage 12, and an EGR cooler 14. The EGR passage 12 is connected to a portion of the exhaust passage 7 at a location downstream of the exhaust emission purifier 8 and to the intake collector 6a of the intake passage 6 at a location downstream of the throttle valve 10a.

The EGR valve mechanism 13 includes a EGR valve 13a of a poppet-type disposed in the EGR passage 12, and an EGR actuator 13b for actuating the EGR valve 13a. A lift amount LEGR of the EGR valve 13a (hereinafter referred to the "EGR valve opening LEGR") is controlled by controlling a duty factor of electric current supplied to the EGR actuator 13b by the ECU 2, whereby an EGR amount GEGR of EGR gases recirculated to the intake passage 6 is adjusted. The EGR cooler 14 is disposed upstream of the EGR valve 13a, and cools high-temperature EGR gases using engine coolant of the engine 3.

Further, the engine 3 is provided with an evaporated fuel processor 15. The evaporated fuel processor 15 is used for supplying evaporated fuel generated in a fuel tank 16 to the cylinders 3a via the intake passage 6. The evaporated fuel processor 15 includes a canister (not shown) and a purge control valve 15a (see FIG. 2).

The canister is connected to the fuel tank 16 and the intake collector 6a. Evaporated fuel is temporarily absorbed by the canister, and then sent (purged) into the intake passage 6 using negative pressure in the intake collector 6a. The opening degree of the purge control valve 15a is controlled by the ECU 2 whereby a purge flow rate of evaporated fuel purged into the intake passage 6 is controlled.

A crankshaft (not shown) of the engine 3 is provided with a crank angle sensor 20. The crank angle sensor 20 delivers a CRK signal, which is a pulse signal, to the ECU 2 along with rotation of the crankshaft, whenever the crankshaft rotates through a predetermined crank angle (e.g. 30°). The ECU 2 calculates a rotational speed NE of the engine 3 (hereafter referred to as the "engine speed NE") based on the CRK signal. Also delivered to the ECU 2 is a detection signal indicative of an operation amount AP of an accelerator pedal (not shown) of the vehicle (hereinafter referred to as the "accelerator pedal opening AP") from an accelerator pedal opening sensor 21.

An atmospheric pressure sensor 22 and an intake air temperature sensor 23 are provided in the intake passage 6 at respective locations upstream of the throttle valve 10a. The atmospheric pressure sensor 22 detects an atmospheric pressure PA and delivers a signal indicative of the detected atmospheric pressure PA to the ECU 2. The intake air temperature sensor 23 detects a temperature TA of fresh air flowing through the intake passage 6 (hereinafter referred to as the "intake air temperature TA") and delivers a signal indicative of the detected intake air temperature TA to the ECU 2.

Further, an intake pressure sensor 24 is provided in the intake collector 6a. The intake pressure sensor 24 detects pressure PB of intake air (hereinafter referred to as the "intake air pressure PB") on a downstream side of the throttle valve 10a as absolute pressure, and delivers a signal indicative of the detected intake air pressure PB to the ECU 2.

Further, an EGR temperature sensor 25 is provided in the EGR passage 12 at a location immediately upstream of the EGR valve 13a. The EGR temperature sensor 25 detects a temperature TEGR of EGR gases flowing through the EGR valve 13a (hereinafter referred to as the "EGR temperature TEGR") and delivers a signal indicative of the detected EGR temperature TEGR to the ECU 2.

The ECU 2 is implemented by a microcomputer comprising a CPU, a RAM, a ROM, and an I/O interface (none of which are shown). The ECU 2 determines operating conditions of the engine 3 based on the detection signals from the above-described sensors 20 to 25 and the like, and executes, depending on the determined operating conditions of the engine 3, control of an amount of fuel to be injected into the engine 3, and an intake control process including respective fresh air amount control and the EGR amount control via the throttle valve 10a and the EGR valve 13a.

In the present embodiment, the ECU 2 corresponds to demanded torque-calculating means, target fresh air amount-setting means, required differential pressure-setting means, differential pressure state-determining means, control means, target EGR amount-setting means, limit intake pressure-setting means, limit intake air amount-calculating means, limit EGR amount-calculating means, and correction means.

Figure 12:
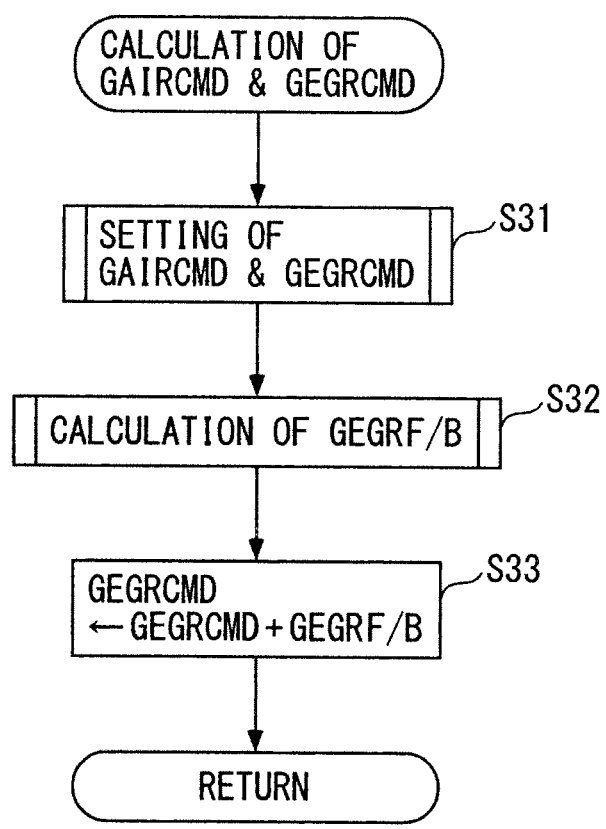
FIG. 12 A flowchart of a main flow of a calculation process for the target fresh air amount and the target EGR amount.

FIG. 12 is a flowchart of a main flow of a calculation process for a target fresh air amount GAIRCMD and a target EGR amount GEGRCMD, included in the intake control process executed by the ECU 2. This process is repeatedly executed whenever a predetermined time period elapses.

In the present process, first, in a step 31 (shown as S31 in FIG. 12; the following steps are also similarly shown), the target fresh air amount GAIRCMD and the target EGR amount GEGRCMD are set. Then, a feedback correction term GEGRF/B for the target EGR amount GEGRCMD is calculated (step 32). Next, the calculated feedback correction term GEGRF/B is added to the target EGR amount GEGRCMD set in the step 31 to thereby calculate the final target EGR amount GEGRCMD (step 33), followed by terminating the present process.

Figure 3:
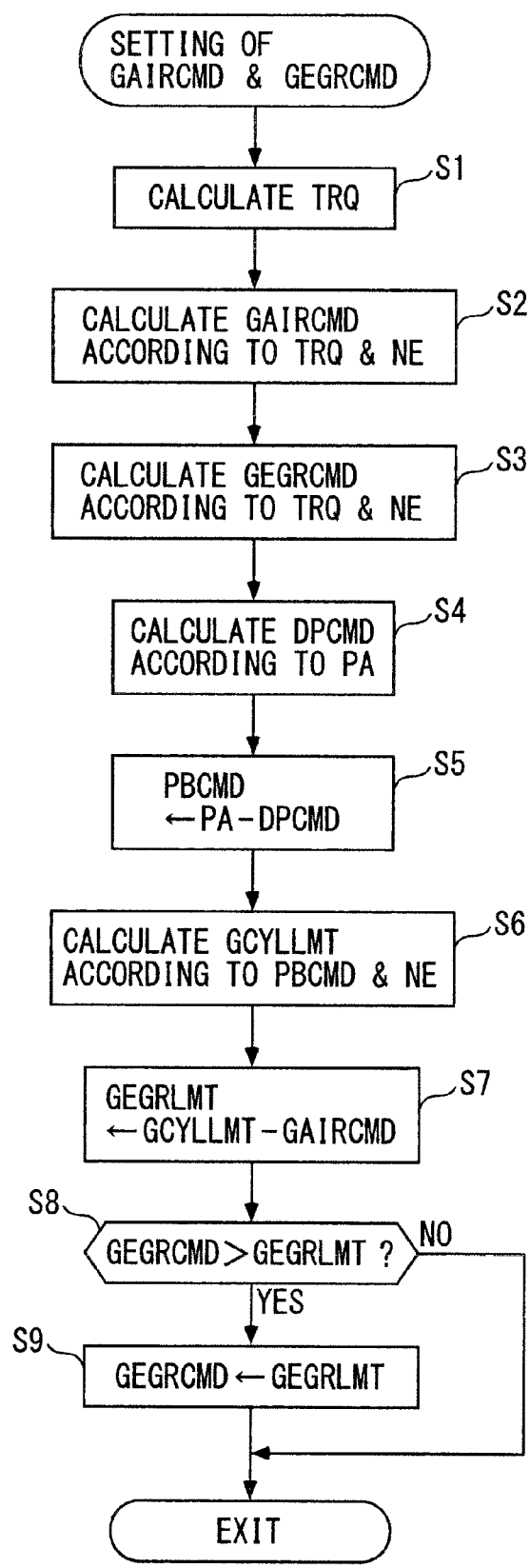
FIG. 3 A flowchart of a setting process for a target fresh air amount and a target EGR amount.

FIG. 3 is a sub routine of the setting process for the target fresh air amount GAIRCMD and the target EGR amount GEGRCMD, executed in the step 31. In the present process, first, in a step 1, a demanded torque TRQ demanded by a driver is calculated by searching a predetermined map (not shown) according to the detected accelerator pedal opening AP and engine speed NE.

Next, the target fresh air amount GAIRCMD is calculated by searching a predetermined map (not shown) for the target fresh air amount according to the calculated demanded torque TRQ and the engine speed NE (step 2). Further, the target EGR amount GEGRCMD is calculated by searching a predetermined map (not shown) for the target EGR amount according to the demanded torque TRQ and the engine speed NE (step 3).

Figure 4:
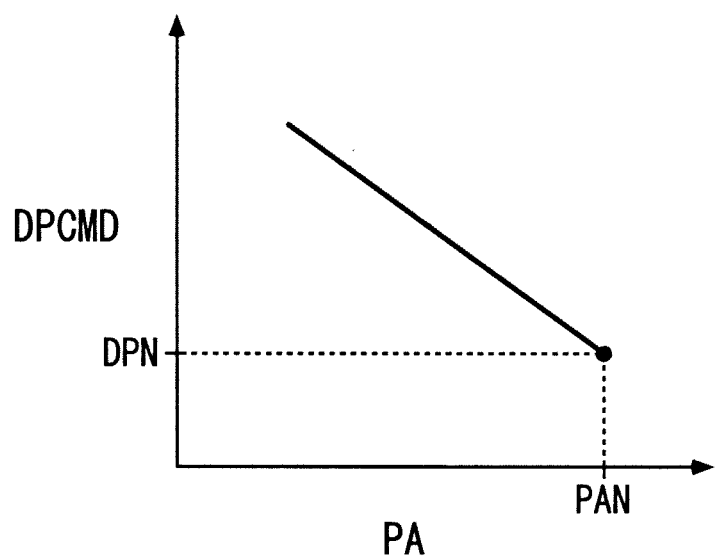
FIG. 4 A map for calculating a required differential pressure.

Next, a required differential pressure DPCMD which is required as a differential pressure across the EGR valve 13a (a difference in pressure between an upstream side and a downstream side) is calculated by searching a map shown in FIG. 4 according to the detected atmospheric pressure PA (step 4).

In this map, the required differential pressure DPCMD is set to a predetermined value DPN (e.g. 50 mmHg) when the atmospheric pressure PA is equal to a predetermined pressure PAN (e.g. 760 mmHg) corresponding to the atmospheric pressure PA at a flatland, and is set to a larger value as the atmospheric pressure PA is lower, i.e. as the altitude is higher. This is because as the atmospheric pressure PA, which is pressure on the upstream side of the EGR valve 13a, is lower, a degree of change in EGR amount with respect to a change in pressure in the downstream side of the same becomes larger, and hence a larger across-valve differential pressure is required in order to stabilize recirculation of EGR gases and control the EGR amount with high accuracy.

Next, a limit intake pressure PBCMD, which is a limit value of the intake pressure PB for ensuring the required differential pressure DPCMD, is calculated by subtracting the calculated required differential pressure DPCMD from the atmospheric pressure PA (step 5).

Figure 5:
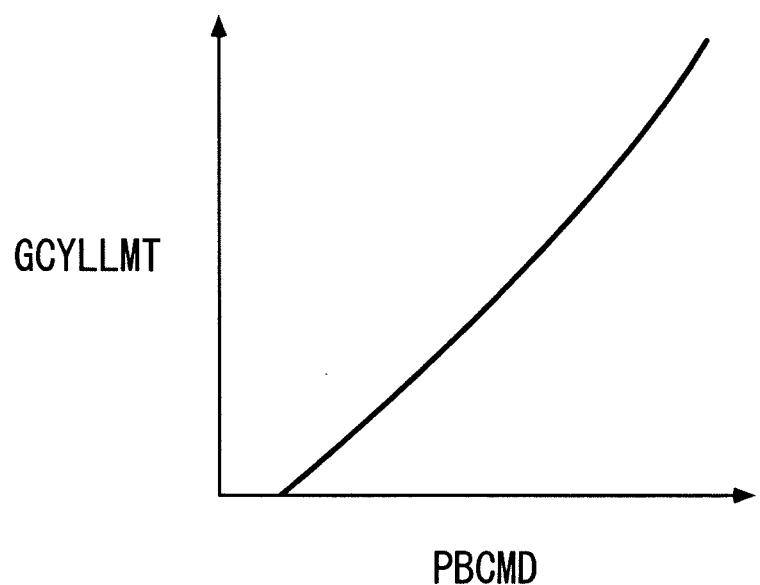
FIG. 5 A map for calculating a limit intake air amount.

Next, a limit intake air amount GCYLLMT is calculated by searching a map shown in FIG. 5 according to the calculated limit intake pressure PBCMD and the engine speed NE (step 6). This map is formed by determining, by experiment or the like, an intake air amount GCYL of intake air which can be drawn into the combustion chamber 3d with respect to the intake pressure PB, and mapping the obtained result as a relationship between the limit intake pressure PBCMD and the limit intake air amount GCYLLMT.

Further, although not shown, this map is formed by m maps created with respect to engine speeds NE1 to NEm which are different from each other, and one of these maps, which corresponds to the actual engine speed NE, is used. Further, in a case where the engine speed NE is equal to none of NE1 to NEm, the limit intake air amount GCYLLMT is obtained by interpolation calculation.

Next, a limit EGR amount GEGRLMT is calculated by subtracting the target fresh air amount GAIRCMD calculated in the step 2 from this limit intake air amount GCYLLMT (step 7). Next, it is determined whether or not the target EGR amount GEGRCMD calculated in the step 3 is larger than the limit EGR amount GEGRLMT (step 8). If the answer to the question of the step 8 is negative (NO), i.e. if the target EGR amount GEGRCMD is not larger than the limit EGR amount GEGRLMT, the present process is immediately terminated. On the other hand, if the answer to the question of the step 8 is affirmative (YES), i.e. if the target EGR amount GEGRCMD is larger than the limit EGR amount GEGRLMT, the target EGR amount GEGRCMD is set to the limit EGR amount GEGRLMT (step 9) to thereby limit the EGR amount, followed by terminating the present process.

Figure 6:
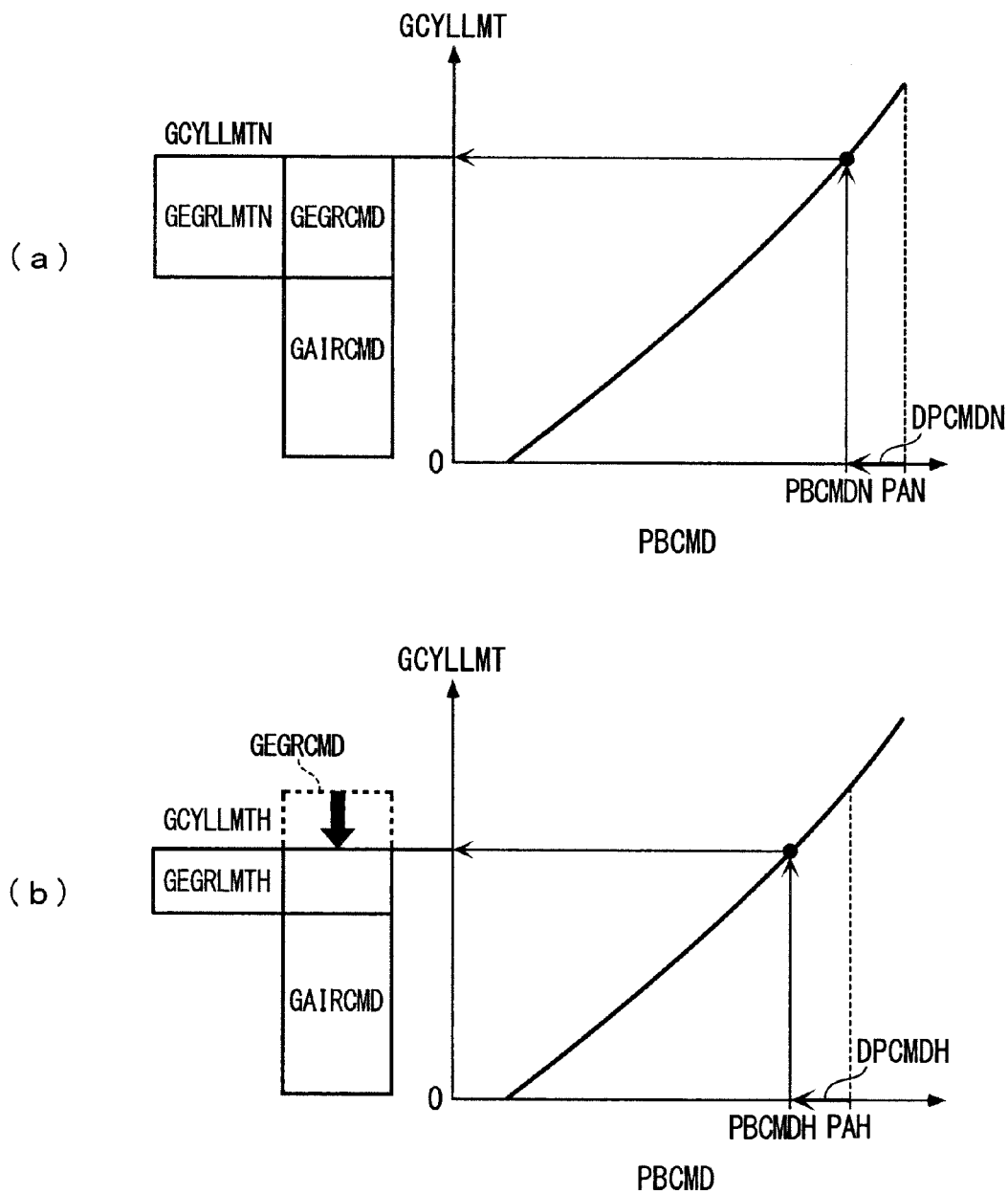
FIG. 6 A diagram showing examples of operation by the setting process in FIG. 3 in cases of (a) flatland conditions and (b) highland conditions.

FIG. 6 shows examples of the operation obtained by the above-described process in FIG. 3 in cases of (a) flatland conditions and (b) highland conditions. As shown in (a), in the case of a flatland, the limit intake pressure PBCMDN is set by subtracting the required differential pressure DPCMDN calculated in the step 4 from the detected atmospheric pressure PAN corresponding to that of the flatland (step 5), and the limit intake air amount GCYLLMTN is calculated according to the set limit intake pressure PBCMDN (step 6). Further, the limit EGR amount GEGRLMTN is calculated by subtracting the target fresh air amount GAIRCMD from the calculated limit intake air amount GCYLLMTN (step 7), and is compared with the target EGR amount GEGRCMD (step 8). In the case of this example, the target EGR amount GEGRCMD is equal to the limit EGR amount GEGRLMTN (NO to the step 8), and hence the target EGR amount GEGRCMD is not subjected to limitation, but is held at the value set in the step 3.

On the other hand, in the case of a highland as shown in (b), the limit intake pressure PBCMDH is calculated by subtracting the larger required differential pressure DPCMDH calculated in the step 4 from the atmospheric pressure PAH corresponding to that of the highland, which is lower than the atmospheric pressure PAN corresponding to that of the flatland, and as a result, the limit intake pressure PBCMDH becomes smaller than the limit intake pressure PBCMDN in the case of the flatland. Accordingly, compared with the case of the flatland, the limit intake air amount GCYLLMTH calculated according to the limit intake pressure PBCMDH becomes smaller, and the limit EGR amount GEGRLMTH calculated by subtracting the target fresh air amount GAIRCMD from the limit intake air amount GCYLLMTH also becomes smaller. As a result, in this example, the target EGR amount GEGRCMD exceeds the limit EGR amount GEGRLMTH (YES to the step 8), so that the target EGR amount GEGRCMD is set and limited to the limit EGR amount GEGRLMTN (step 9).

Figure 13:
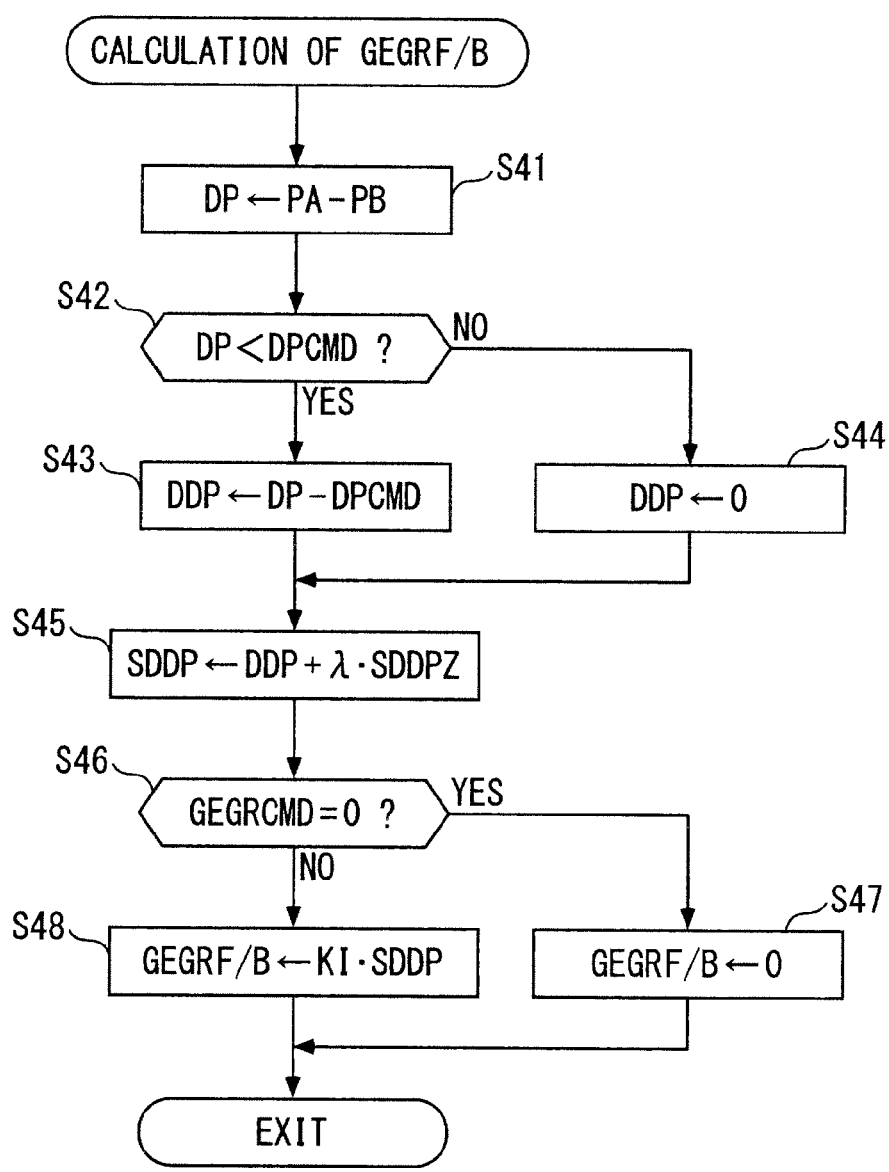
FIG. 13 A flowchart of a calculation process for a feedback correction term of the target EGR amount.

FIG. 13 shows a subroutine of a calculation process for the feedback correction term GEGRF/B for the target EGR amount GEGRCMD, executed in the step 32 in FIG. 12. In the present process, first, in a step 41, a difference between the detected atmospheric pressure PA and the intake pressure PB is calculated as an actual differential pressure DP. Next, it is determined whether or not the calculated actual differential pressure DP is smaller than the required differential pressure DPCMD (step 42).

If the answer to the question of the step 42 is affirmative (YES), i.e. if the actual differential pressure DP is smaller than the required differential pressure DPCMD, which means that the required differential pressure across the EGR valve 13a is not ensured, a difference (DP−DPCMD) between the actual differential pressure DP and the required differential pressure DPCMD is calculated as a differential pressure deviation DDP (step 43). On the other hand, if the answer to the question of the step 42 is negative (NO), i.e. if DP≥DPCMD, which means that the required across-valve differential pressure is ensured, the differential pressure deviation DDP is set to 0 (step 44). As described above, substantially only when the actual differential pressure DP is smaller than the required differential pressure DPCMD, the differential pressure deviation DDP is calculated as the difference (negative value) between DP and DPCMD.

Next, in a step 45, a deviation integrated value SDDP is calculated by an equation of SDDP=DDP+λ·SDDPZ using the differential pressure deviation DDP calculated in the step 43 or 44. In this equation, SDDPZ in the right side represents the immediately preceding value of the deviation integrated value SDDP, and λ represents a predetermined forgetting coefficient satisfying 0<λ<1.

Next, it is determined whether or not the target EGR amount GEGRCMD set in the process in FIG. 3 is equal to 0 (step 46). If the answer to the question of the step 46 is affirmative (YES), i.e. if EGR is not executed, the feedback correction term GEGRF/B is set to 0 (step 47), followed by terminating the present process. On the other hand, if the answer to the question of the step 46 is negative (NO), the deviation integrated value SDDP calculated in the step 45 is multiplied by a predetermined integration gain KI to thereby calculate the feedback correction term GEGRF/B (step 48), followed by terminating the present process.

As is clear from the above calculation method, the feedback correction term GEGRF/B is calculated as a negative value according to the deviation integrated value SDDP, which is an integrated value of the difference between DP and DPCMD when the actual differential pressure DP is smaller than the required differential pressure DPCMD during execution of EGR. As described above, since the calculated feedback correction term GEGRF/B is added to the target EGR amount GEGRCMD in the step 33 in FIG. 12, the final target EGR amount GEGRCMD is thereby reducingly corrected in a feedback manner.

Further, since the forgetting coefficient λ is used when calculating the deviation integrated value SDDP, it is possible to prevent the feedback correction term GEGRF/B from being excessively increased due to saturation of the deviation integrated value SDDP along with progress of calculation of SDDP, and thereby avoid excessive correction, and it is possible to immediately terminate the feedback correction after insufficiency of the across-valve differential pressure is solved.

Hereinafter, reducing correction of the target EGR amount GEGRCMD using the above-described feedback correction term GEGRF/B is referred to as the "feedback correction", and limitation of the target EGR amount GEGRCMD to the limit EGR amount GEGRLMT in the above-described process in FIG. 3 is referred to as the "feedforward correction".

FIG. 14 schematically shows changes in the target EGR amount GEGRCMD and the intake pressure PB occurring according to shifts in the operating region of the engine 3, as an example of operation obtained by the above-described process in FIG. 12 together with a comparative example.

As shown in upper right part in the figure, an operating region A of the engine 3 is a region in which the demanded torque TRQ is small and hence the intake pressure PB is low, making the differential pressure across the EGR valve 13a large by nature, so that the target EGR amount GEGRCMD is not limited to the limit EGR amount GEGRLMT because. An operating region B is a region in which the demanded torque TRQ is a medium degree, and the target EGR amount GEGRCMD is limited to the limit EGR amount GEGRLMT so as to ensure the across-valve differential pressure. Further, an operating region C is a region in which the demanded torque TRQ is large and hence the load is high, causing the target EGR amount GEGRCMD to be originally set to 0, so that the target EGRGCMD is not required to be limited.

Further, a dotted line in the figure indicates an example of operation in a case where there is no deviation of the intake characteristics caused by variation in hardware configuration or the like, a solid line indicates an example of operation in a case where there is a deviation of the intake characteristics, and a dashed-dotted line indicates a comparative example in a case where there is a deviation of the intake characteristics, and only feedforward correction of the target EGR amount GEGRCMD is applied while omitting the feedback correction.

In the examples, the operating region of the engine 3 is shifted in the order of A→B→C→B→A. Of these regions, in the operating regions A and C, the target EGR amount GEGRCMD is not limited for the above-mentioned reasons, and a value set according to the demanded torque TRQ etc. in the step 3 in FIG. 3 is directly used as the target EGR amount GEGRCMD. According to the target EGR amount GEGRCMD, the intake pressure PB is controlled to a target value dependent on the demanded torque TRQ with a response delay indicated by a curve.

Further, when the engine 3 is shifted from the operating region C or A to the operating region B, the feedforward correction is executed as the target EGR amount GEGRCMD (broken line in the figure) set in the step 3 exceeds the limit EGR amount GEGRLMT (step 8 in FIG. 3: YES), whereby the target EGR amount GEGRCMD is limited to the limit EGR amount GEGRLMT (dotted line). As a result, in a case where there is no deviation of the intake characteristics, the intake pressure PB is controlled such that it becomes equal to a difference (=PA−DPCMD) between the atmospheric pressure PA and the required differential pressure DPCMD, which is the target value at this time, with a response delay as indicated by the dotted line, whereby the required differential pressure DPCMD is ensured.

On the other hand, in a case where there is a deviation of the intake characteristics, even if the feedforward correction is executed in the operating region B as described above, the intake pressure PB exceeds the target value, causing overshoot, as indicated by the dashed-dotted line, which sometimes prevents the required differential pressure DPCMD from being ensured. In such a case, according to the present embodiment, when the actual differential pressure DP becomes less than the required differential pressure DPCMD (step 42 in FIG. 13: YES), the feedback correction is executed, whereby the target EGR amount GEGRCMD is reducingly corrected by an amount corresponding to the feedback correction term GEGRF/B (solid line). As a result, as indicated by the solid line, the intake pressure PB is controlled such that it converges to the target value with a response delay, whereby it is possible to ensure the required differential pressure DPCMD.

As described hereinafter, in the present embodiment, a target opening degree θTHCMD of the throttle valve 10a and a target opening degree LEGRCMD of the EGR valve 13a are calculated based on the limit intake pressure PBCMD, the target fresh air amount GAIRCMD, and the target EGR amount GEGRCMD, calculated as described above. Hereafter, a nozzle expression used in calculation of these values will be described first.

This nozzle expression is formed by regarding a fluid flowing through a nozzle as compressible fluid, and modeling a relationship between upstream and downstream pressures across the nozzle and a flow rate of the fluid flowing through the nozzle, and a general expression thereof is expressed by the following equation (1):

$$G = K \cdot P1 \cdot \sqrt{\frac{1}{R \cdot T}} \cdot \Psi \quad (1)$$

In this equation, G in the left side represents a flow rate of fluid, K in the right side represents an opening function determined according to the configuration and opening degree of the nozzle, P1 represents a pressure on the upstream side of the nozzle, R represents a gas constant of the fluid, and T represents a temperature of the fluid. Further, Ψ represents a pressure function defined by the following equation (2):

$$\text{When } \frac{P2}{P1} > \left(\frac{2}{\kappa+1}\right)^{\frac{\kappa}{\kappa-1}} \quad (2)$$

$$\Psi = \sqrt{\frac{2\kappa}{\kappa-1}\left\{\left(\frac{P2}{P1}\right)^{\frac{2}{\kappa}} - \left(\frac{P2}{P1}\right)^{\frac{\kappa+1}{\kappa}}\right\}}$$

$$\text{When } \frac{P2}{P1} \leq \left(\frac{2}{\kappa+1}\right)^{\frac{\kappa}{\kappa-1}}$$

$$\Psi = \sqrt{\kappa\left(\frac{2}{\kappa+1}\right)^{\frac{\kappa+1}{\kappa-1}}}$$

Figure 7:
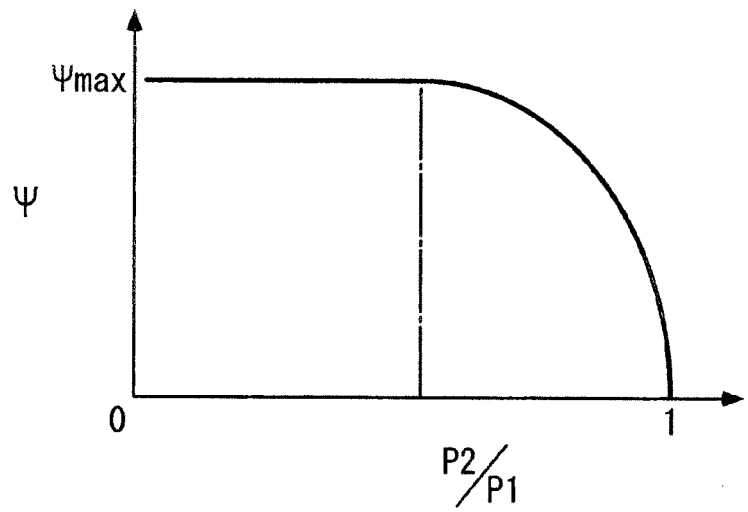
FIG. 7 A diagram showing a pressure function.

In this equation, P2 represents a pressure on the downstream side of the nozzle, and κ represents a specific heat ratio of the fluid. As is clear from the equation (2) and FIG. 7 showing the equation (2), the pressure function Ψ is univocally determined only according to a pressure ratio P2/P1 between the downstream pressure P2 and the upstream pressure P1 regardless of the configuration and opening degree of the nozzle, and when the pressure ratio P2/P1 is not more than a predetermined value corresponding to a sonic speed, the pressure function Ψ takes a fixed maximum value Ψmax.

Further, when the equation (1) is expressed with respect to the opening function K, there is obtained the following equation (3):

$$K = \frac{G\sqrt{R \cdot T}}{P1 \cdot \Psi} \quad (3)$$

When applying the above-described nozzle expression to the throttle valve 10a, the fluid flow rate G, the opening function K, the upstream pressure P1, the downstream pressure P2, the fluid temperature T, and the pressure function Ψ in the equations (1) to (3) are replaced by the target fresh air amount GAIRCMD, an opening function KTH of the throttle valve 10a, the atmospheric pressure PA, the limit intake pressure PBCMD, the intake air temperature TA, and a pressure function ΨTH of the throttle valve 10a, respectively. As a result, the equations (1) to (3) are rewritten into the following equations (4) to (6), respectively:

$$GAIRCMD = KTH \cdot PA \cdot \sqrt{\frac{1}{R \cdot TA}} \cdot \Psi TH \quad (4)$$

$$\text{When } \frac{PBCMD}{PA} > \left(\frac{2}{\kappa+1}\right)^{\frac{\kappa}{\kappa-1}} \quad (5)$$

$$\frac{\Psi TH}{(\Psi EGR)} = \sqrt{\frac{2\kappa}{\kappa-1}\left\{\left(\frac{PBCMD}{PA}\right)^{\frac{2}{\kappa}} - \left(\frac{PBCMD}{PA}\right)^{\frac{\kappa+1}{\kappa}}\right\}}$$

$$\text{When } \frac{PBCMD}{PA} \leq \left(\frac{2}{\kappa+1}\right)^{\frac{\kappa}{\kappa-1}}$$

$$\frac{\Psi TH}{(\Psi EGR)} = \sqrt{\kappa\left(\frac{2}{\kappa+1}\right)^{\frac{\kappa+1}{\kappa-1}}}$$

$$KTH = \frac{GAIRCMD \cdot \sqrt{R \cdot TA}}{PA \cdot \Psi TH} \quad (6)$$

Further, when applying the nozzle expression to the EGR valve 13a, the fluid flow rate G, the opening function K, the upstream pressure P1 and the downstream pressure P2, the fluid temperature T, and the pressure function Ψ in the equations (1) to (3) are replaced by the target EGR amount GEGRCMD, an opening function KEGR of the EGR valve 13a, the atmospheric pressure PA and the limit intake pressure PBCMD similarly to the case of the throttle valve 10a, the EGR temperature TEGR, and a pressure function ΨEGR for the EGR valve 13a, respectively. As a result, the equations (1) and (3) are rewritten into the following equations (7) and (8):

$$GEGRCMD = KEGR \cdot PA \cdot \sqrt{\frac{1}{R \cdot TEGR}} \cdot \Psi EGR \quad (7)$$

$$KEGR = \frac{GEGRCMD \cdot \sqrt{R \cdot TEGR}}{PA \cdot \Psi EGR} \quad (8)$$

Note that as described above, to use the atmospheric pressure PA and the limit intake pressure PBCMD as the upstream pressure P1 and the downstream pressure P2 is common between this case and the case of the throttle valve 10a, and hence the pressure function ΨEGR for the EGR valve 13a is the same as the pressure function ΨTH for the throttle valve 10a, and is calculated by the equation (5).

Figure 8:
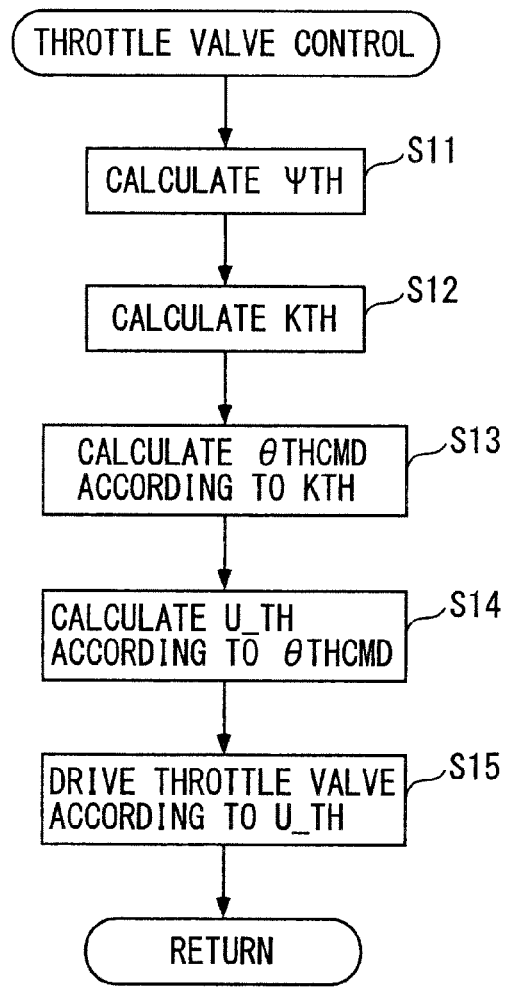
FIG. 8 A flowchart of a control process for a throttle valve.

Next, a control process for the throttle valve 10a executed based on the target fresh air amount GAIRCMD will be described with reference to FIG. 8. In the present process, first, in a step 11, the pressure function ΨTH for the throttle valve 10a is calculated by the above equation (5) according to the atmospheric pressure PA and the limit intake pressure PBCMD. Next, the opening function KTH of the throttle valve 10a is calculated by the equation (6) using the calculated pressure function ΨTH (step 12).

Figure 9:
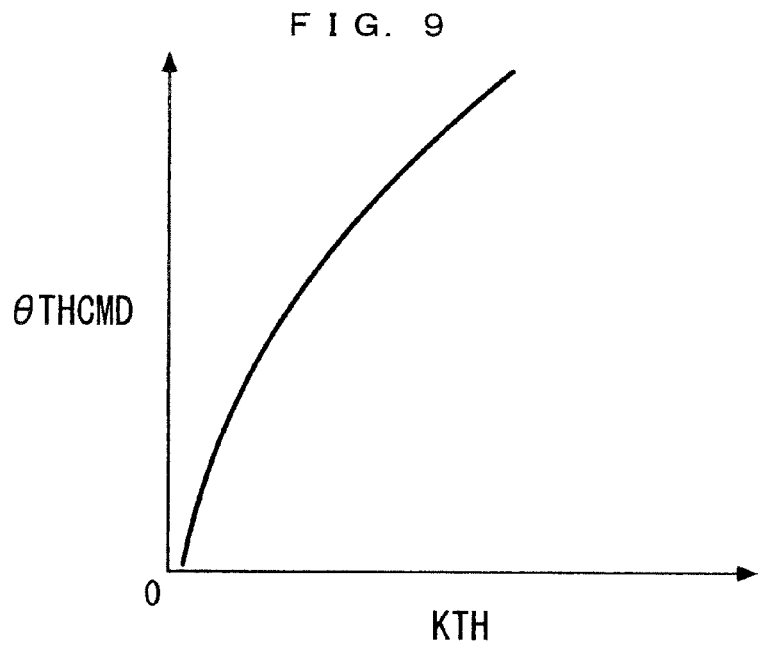
FIG. 9 A map for calculating a target opening degree of the throttle valve.

Next, the target opening degree θTHCMD of the throttle valve 10a is calculated by searching a map shown in FIG. 9 according to the opening function KTH (step 13). This map is formed by determining, by experiment or the like, a relationship between the opening function KTH and the throttle valve opening θTH, and mapping the obtained relationship as a relationship between the opening function KTH and the target opening degree θTHCMD, and as the opening function KTH is larger, the target opening degree θTHCMD is set to a larger value.

Next, a control input U_TH is calculated by searching a predetermined map (not shown) according to the calculated target opening degree θTHCMD (step 14). Then, a drive signal based on the calculated control input U_TH is output to the TH actuator 10b to thereby drive the throttle valve 10a (step 15), whereby the throttle valve opening θTH is controlled to the target opening degree θTHCMD, followed by terminating the present process.

Figure 10:
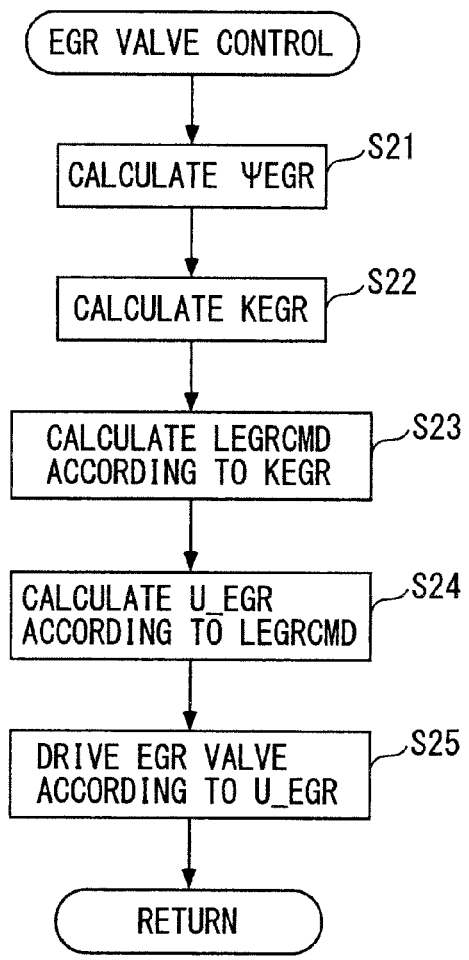
FIG. 10 A flowchart of a control process for an EGR valve.

Next, a control process for the EGR valve 13a executed based on the target EGR amount GEGRCMD will be described with reference to FIG. 10. In the present process, first, in a step 21, the pressure function ΨEGR for the EGR valve 13a is calculated by the above equation (5) according to the atmospheric pressure PA and the limit intake pressure PBCMD. Next, the opening function KEGR of the EGR valve 13a is calculated by the equation (8) using the calculated pressure function ΨEGR (step 22).

Figure 11:
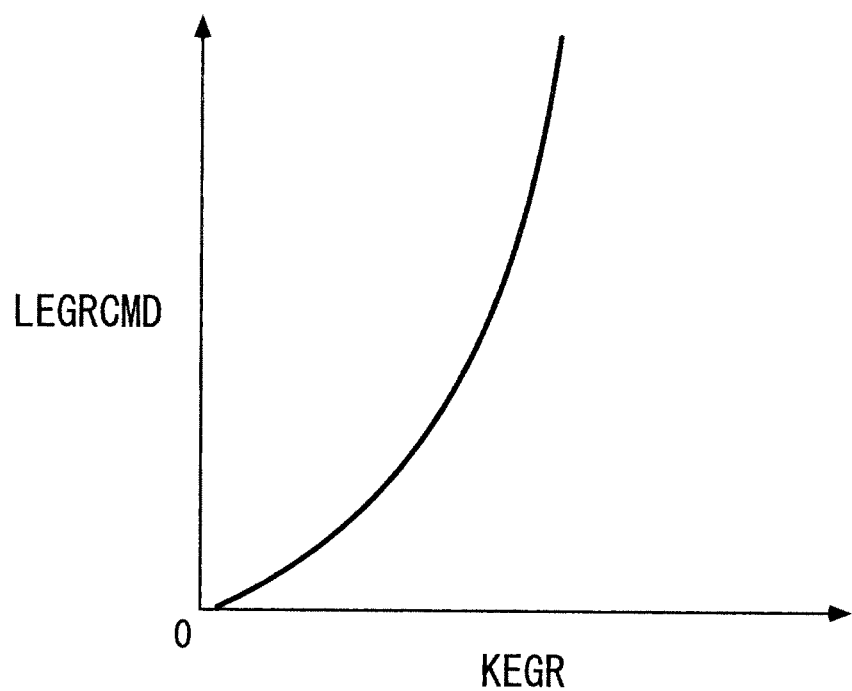
FIG. 11 A map for calculating a target opening degree of the EGR valve.

Next, the target opening degree LEGRCMD of the EGR valve 13a is calculated by searching a map shown in FIG. 11 according to the opening function KEGR (step 23). This map is formed by determining, by experiment or the like, a relationship between the opening function KEGR and the EGR valve opening LEGR, and mapping the obtained relationship as a relationship between the opening function KEGR and the target opening degree LEGRCMD, and as the opening function KEGR is larger, the target opening degree LEGRCMD is set to a larger value. Further, as described above, while the throttle valve 10a is of the butterfly type, the EGR valve 13a is of the poppet type, and hence the map in FIG. 11 is different in shape from the map for the throttle valve 10a in FIG. 9 because of the difference in the valve type.

Next, a control input U_EGR is calculated by searching a predetermined map (not shown) according to the calculated target opening degree LEGRCMD (step 24). Then, a drive signal based on the control input U_EGR is output to the EGR actuator 13b to thereby drive the EGR valve 13a (step 25), whereby the EGR valve opening LEGR is controlled to the target opening degree LEGRCMD, followed by terminating the present process.

As described above, according to the present embodiment, the limit intake pressure PBCMD for ensuring the required differential pressure DPCMD is set by subtracting the required differential pressure DPCMD from the detected atmospheric pressure PA, and the limit intake air amount GCYLLMT of intake air which can be drawn into the combustion chamber 3d is calculated based on the set limit intake pressure PBCMD. Further, the limit EGR amount GEGRLMT is calculated by subtracting the target fresh air amount GAIRCMD from the limit intake air amount GCYLLMT.

Then, when the target EGR amount GEGRCMD is larger than the limit EGR amount GEGRLMT, it is determined that the required differential pressure DPCMD cannot be ensured, and the target EGR amount GEGRCMD is limited to the limit EGR amount GEGRLMT. By this control, it is possible to maintain the target fresh air amount GAIRCMD, and ensure the fresh air amount, and therefore, it is possible to meet a torque demand by the driver, and maintain drivability. Further, by limiting the target EGR amount GEGRCMD such that the sum of the target EGR amount GEGRCMD and the target fresh air amount GAIRCMD becomes equal to the limit intake air amount GCYLLMT, it is possible to increase the across-valve differential pressure to thereby ensure the required differential pressure DPCMD, and therefore, it is possible to stably recirculate exhaust gases, and control the EGR amount with high accuracy.

Further, a difference between the detected atmospheric pressure PA and intake pressure PB is calculated as the actual differential pressure DP, and when the actual differential pressure DP is smaller than the required differential pressure DPCMD, the target EGR amount GEGRCMD is reducingly feedback-corrected, and hence it is possible to secure the required differential pressure DPCMD even when there is caused a deviation of the intake characteristics by variation in hardware configuration or aging.

Further, a difference between the atmospheric pressure PA and intake pressure PB is used as the differential pressure across the EGR valve 13a, and hence it is possible to effectively obtain the above-described effects while properly reflecting a difference in pressure between the upstream side and the downstream side of the EGR valve 13a. Further, the atmospheric pressure PA is a parameter usually used for controlling the engine 3, and hence a detection result from the existing atmospheric pressure sensor 22 disposed for detecting the atmospheric pressure PA can be directly used. Further, since the required differential pressure DPCMD is ensured, the difference between the detected atmospheric pressure PA and intake pressure PB is controlled such that it becomes equal to the target value, and hence it is possible to perform the control using the difference between the two pressures, e.g. purge control for purging evaporated fuel into the intake passage 6 using a negative pressure in the intake collector 6a, with high accuracy.

Further, since the required differential pressure DPCMD is set to a larger value as the detected atmospheric pressure PA is lower, it is possible to ensure a larger across-valve differential pressure and stabilize recirculation of exhaust gases, and therefore, even when the atmospheric pressure is low, it is possible to control the EGR amount with high accuracy.

Note that the present invention is by no means limited to the embodiment described above, but can be practiced in various forms. For example, although in the above-described embodiment, the difference between the detected atmospheric pressure PA and intake pressure PB is used as the differential pressure across the EGR valve 13a, this is not limitative, but any other parameter may be used insofar as it properly reflects a difference in pressure between the upstream side and the downstream side of the EGR valve 13a. For example, a difference in pressure between the immediately upstream side and the immediately downstream side of the EGR valve 13a in the EGR passage 12 may be used as the differential pressure across the EGR valve 13a, or a difference in pressure between the exhaust passage 7 and a desired portion of the intake passage 6 at a location downstream of the throttle valve 10a may be used. Also in these cases, the required differential pressure DPCMD is set to a larger value as the detected atmospheric pressure PA is lower.

Further, although in the embodiment, whether or not the across-valve differential pressure is in a state in which the required differential pressure can be ensured is determined by comparing the limit EGR amount GEGRLMT, which is a difference between the limit intake air amount GCYLLMT and the target fresh air amount GAIRCMD, with the target EGR amount GEGRCMD, this is not limitative, but it is to be understood that the determination may be performed by comparing the limit intake air amount GCYLLMT with a sum (=target total intake air amount) of the target fresh air amount GAIRCMD and the target EGR amount GEGRCMD. In this case, the limit EGR amount GEGRLMT is calculated by subtracting a difference between the target total intake air amount and the limit intake air amount GCYLLMT from the target EGR amount GEGRCMD.

Furthermore, although in the above-described embodiment, the present invention is applied to the automotive gasoline engine, this is not limitative, but it can be applied to various engines other than the gasoline engine, e.g. a diesel engine, and further, it can be applied to engines other than the engines for vehicles, e.g. engines for ship propulsion machines, such as an outboard motor having a vertically-disposed crankshaft. Further, it is possible to change details of the construction of the embodiment within the spirit and scope of the present invention.

INDUSTRIAL APPLICABILITY

As described heretofore, the intake control system for an internal combustion engine according to the present invention is effective in ensuring a differential pressure across an EGR valve and controlling an EGR amount with high accuracy while maintaining drivability, even in a case where an air-fuel mixture of a stoichiometric air-fuel ratio is burned.

REFERENCE SIGNS LIST

2 ECU (demanded torque-calculating means, target fresh air amount-setting means, required differential pressure-setting means, differential pressure state-determining means, control means, target EGR amount-setting means, limit intake pressure-setting means, limit intake air amount-calculating means, limit GER amount-calculating means, and correction means)
3 engine (internal combustion engine)
3d combustion chamber
6 intake passage
7 exhaust passage
10a throttle valve
12 EGR passage
13a EGR valve
20 crank angle sensor (operating condition-detecting means)
21 accelerator pedal opening sensor (operating condition-detecting means)
22 atmospheric pressure sensor (atmospheric pressure-detecting means)
24 intake pressure sensor (intake pressure-detecting means)
GAIR fresh air amount
GEGR EGR amount
NE engine speed (operating condition of the engine)
AP accelerator pedal opening (operating condition of the engine)
LEGR EGR valve opening (opening degree of the EGR valve)
LEGRCMD target opening degree of the EGR valve
TRQ demanded torque
GAIRCMD target fresh air amount
DPCMD required differential pressure
DP actual differential pressure (difference between the atmospheric pressure and the intake pressure)
θTH throttle valve opening (opening degree of the throttle valve)
θTHCMD target opening degree of the throttle valve
PA atmospheric pressure
PB intake pressure
GEGRCMD target EGR amount
PBCMD limit intake pressure
GCYLLMT limit intake air amount
GEGRLMT limit EGR amount
GEGRF/B feedback correction term of the target EGR amount

The invention claimed is:

1. An intake control system for an internal combustion engine, comprising:
a throttle valve provided in an intake passage of the engine, for adjusting an amount of fresh air drawn into a combustion chamber;
an EGR passage for recirculating part of exhaust gases discharged from the combustion chamber into an exhaust passage to a downstream side of said throttle valve in the intake passage;
an EGR valve disposed in an intermediate portion of said EGR passage, for adjusting an EGR amount, which is an amount of exhaust gases recirculated through said EGR passage;
operating condition-detecting means for detecting operating conditions of the engine;
demanded torque-calculating means for calculating a demanded torque demanded by a driver according to the detected operating conditions of the engine;
target fresh air amount-setting means for setting a target fresh air amount based on the calculated demanded torque;
required differential pressure-setting means for setting an across-valve differential pressure required to stably recirculate exhaust gases, which is a difference in pressure between an upstream side and a downstream side of said EGR valve, as a required differential pressure;
differential pressure state-determining means for determining whether or not the across-valve differential pressure is in a state in which the set required differential pressure can be ensured; and
control means for, when it is determined that the across-valve differential pressure is not in the state in which the set required differential pressure can be ensured, reducingly controlling an opening degree of said EGR valve to thereby limit the EGR amount and controlling an opening degree of said throttle valve such that the target fresh air amount of fresh air is drawn into the combustion chamber, so as to ensure the required differential pressure.

2. The intake control system according to claim 1, further comprising:
   atmospheric pressure-detecting means for detecting atmospheric pressure;
   target EGR amount-setting means for setting a target EGR amount based on operating conditions of the engine;
   limit intake pressure-setting means for setting a limit intake pressure for ensuring the required differential pressure, by subtracting the required differential pressure from the detected atmospheric pressure;
   limit intake air amount-calculating means for calculating a limit intake air amount of intake air which can be drawn into the combustion chamber based on the set limit intake pressure; and
   limit EGR amount-calculating means for calculating a limit EGR amount by subtracting the target fresh air amount from the calculated limit intake air amount, and
   wherein said differential pressure state-determining means determines whether or not the across-valve differential pressure is in a state in which the required differential pressure can be ensured, by comparing the set target EGR amount and the calculated limit EGR amount, and
   wherein when the target EGR amount is larger than the limit EGR amount, said control means limits the target EGR amount to the limit EGR amount, and controls the opening degree of said EGR valve based on the limited target EGR amount.

3. The intake control system according to claim 2, further comprising:
   intake pressure-detecting means for detecting pressure in the intake passage on the downstream side of said throttle valve as intake pressure; and
   correction means for reducingly correcting the target EGR amount when a difference between the atmospheric pressure and the detected intake pressure is smaller than the required differential pressure.

4. The intake control system according to claim 1, further comprising atmospheric pressure-detecting means for detecting atmospheric pressure, and
   wherein said required differential pressure-setting means sets the required differential pressure to a larger value as the detected atmospheric pressure is lower.

* * * * *